US007127790B2

(12) United States Patent
Lin et al.

(10) Patent No.: US 7,127,790 B2
(45) Date of Patent: Oct. 31, 2006

(54) METHOD FOR INSERTING A WAX GUARD INTO THE RECEIVER TUBE OF A HEARING INSTRUMENT

(75) Inventors: Shin Chai Mark Lin, Millburn, NJ (US); Abram Reitblat, Morristown, NJ (US)

(73) Assignee: Siemens Hearing Instruments, Inc., Piscataway, NJ (US)

( * ) Notice: Subject to any disclaimer, the term of this patent is extended or adjusted under 35 U.S.C. 154(b) by 230 days.

(21) Appl. No.: 10/791,584

(22) Filed: Mar. 2, 2004

(65) Prior Publication Data

US 2005/0193547 A1 Sep. 8, 2005

(51) Int. Cl.
*B23P 11/02* (2006.01)

(52) U.S. Cl. .......................................... 29/451; 29/450

(58) Field of Classification Search ............. 29/525.01, 29/270, 278, 428, 896.2, 896.21, 896.23, 29/451, 450; 381/328, 329
See application file for complete search history.

(56) References Cited

U.S. PATENT DOCUMENTS

| | | | | |
|---|---|---|---|---|
| 4,972,488 A * | 11/1990 | Weiss et al. | ................ | 381/325 |
| 6,795,562 B1 * | 9/2004 | Gunnersen et al. | ......... | 381/325 |

* cited by examiner

*Primary Examiner*—John C. Hong
(74) *Attorney, Agent, or Firm*—Mark H. Jay; Joel Miller

(57) ABSTRACT

Insertion of a wax guard with a bridge into the receiver tube of a hearing instrument may be accomplished with a tool that grasps the wax guard securely, inserts the wax guard into the tube, and then slides off of the wax guard, leaving the wax guard within the tube.

2 Claims, 6 Drawing Sheets

METHOD FOR INSERTING A WAX GUARD INTO THE RECEIVER TUBE OF A HEARING INSTRUMENT

BACKGROUND AND SUMMARY OF THE INVENTION

Wax guards prevent cerumen or ear wax from entering the shell of a hearing instrument through the receiver tube, the conduit that passes the sound generated by the receiver to the outside and ultimately towards the ear drum of the person wearing the instrument. One type of wax guard comprises a cylinder with a flange and a bridge that spans the flange, covering the opening of the cylinder. Over time however wax does work its way under the bridge and into the cylindrical portion of the wax guard and at some point the wax guard must be replaced to insure the passage of sound.

Since the wax guard is a fairly small component, a tool is provided to transfer the wax guard from its packaging to the receiver tube of the hearing instrument. A tool having a pair of opposing, spaced-apart elements exhibiting a degree of spring-like action is placed on the top of the bridge of the wax guard. The tool is then pushed downwardly to force apart the opposing elements so that they will slip under the bridge. Protrusions on the opposing elements of the tool enhance the tool's ability to maintain a grasp underneath the bridge. Next, the tool is lifted, pulling the wax guard out of the holder and then guides the wax guard into the end of a receiver tube. The tool can then be removed from the wax guard by sliding the tool laterally along a line defined by the span of the bridge. The spring action of the tool allows the elements move apart and clear the bridge while insuring that the wax guard remains seated in the receiver tube.

DESCRIPTION OF THE INVENTION

Figure 1:
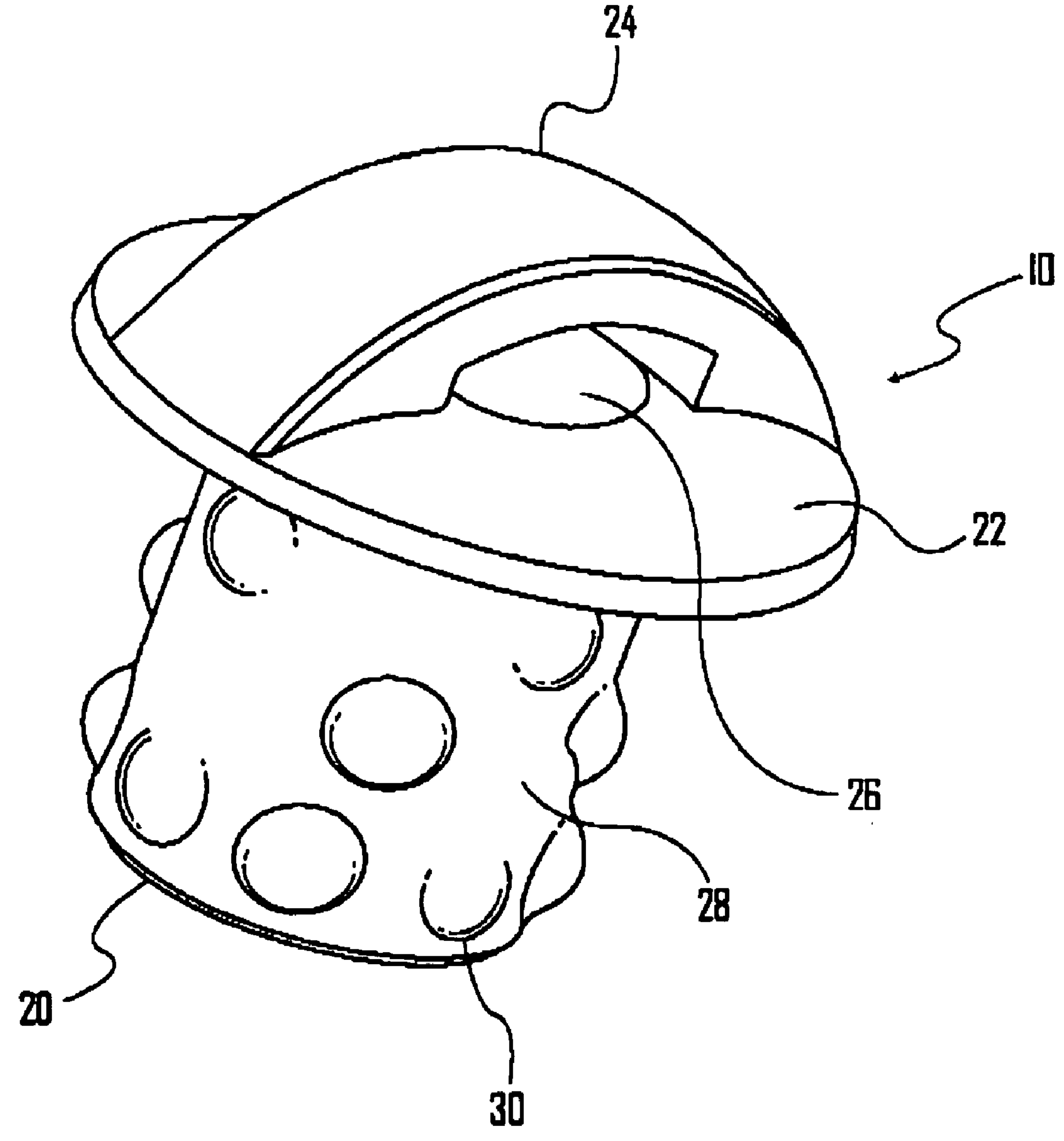
FIG. 1 is a perspective drawing of a wax guard.

A wax guard 10 having a cylindrical portion 20, a flange 22, and a bridge 24 spanning an opening 26 is shown in FIG. 1. The opening 26 is at one end of the inside (not shown) of the cylindrical portion 20. The outer surface 28 of the cylindrical portion 20 may have raised elements such as the dimples 30 shown here to create an interference fit when inserted into a receiver tube (see FIG. 7).

Figure 2:
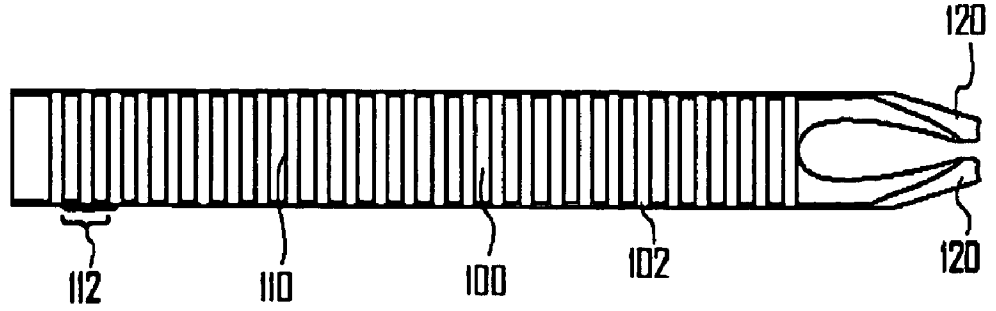
FIGS. 2, 3, and 4 depict several views of a tool for grasping and inserting a wax guard into the receiver tube of a hearing instrument.
Figure 3:
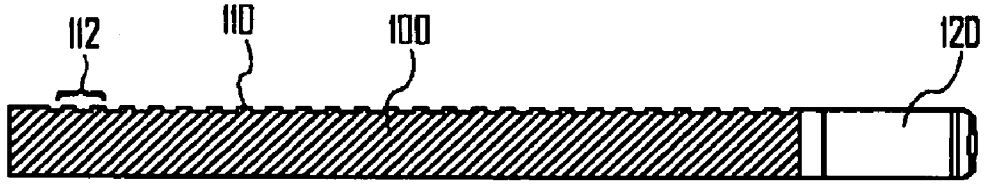
Figure 4:
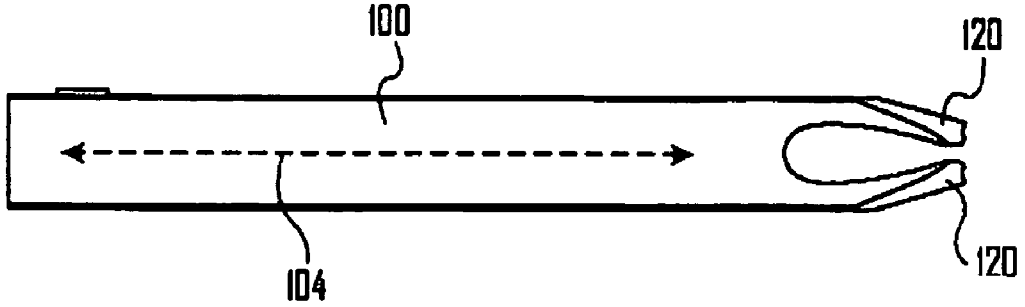

A tool 100 for grasping and inserting a wax guard 10 into a receiver tube is shown in FIGS. 2–6. FIGS. 2, 3, and 4 are top, side, and bottom views, respectively, of the tool 100. The tool 100 has a shaft or support element 102 that defines an axis 104 as a dashed line in FIG. 4). The top surface 110 of the support element 102 may have crenelations 112 to provide a grip for the user.

Figure 5:
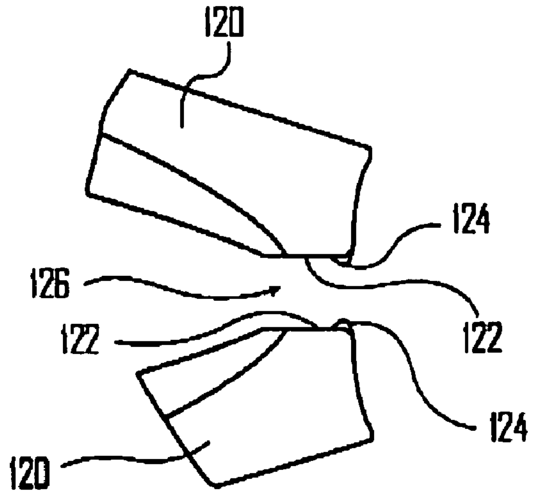
FIGS. 5 and 6 are drawings of a portion of the tool of FIGS. 2–4.
Figure 6:
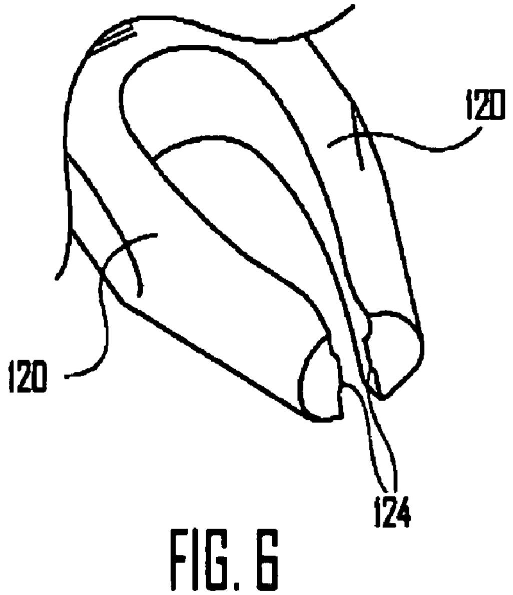

The portion of the tool 100 that grasps the wax guard 10 is the shown on the right in FIGS. 2–4 and in more detail in FIGS. 5 and 6. A pair of flexible, opposing, spaced-apart jaws 120 are affixed to the support element or shaft 102 and oriented in a direction parallel to the tool axis 104. The jaws 120 exhibit spring-like action and will move apart when pushed in a direction parallel to the axis 104 of the tool 100 over the bridge 24 of a wax guard 10, which has a dimension greater than the distance between the jaws 120 in their unflexed state.

The inner faces 122 of the jaws 120 may be provided with protrusions 124 that will slide under the bridge 24 of the wax guard 10. To facilitate grasping and releasing the wax guard 10, the edges of the protrusions 124 can be provided with a radius.

Figure 7:
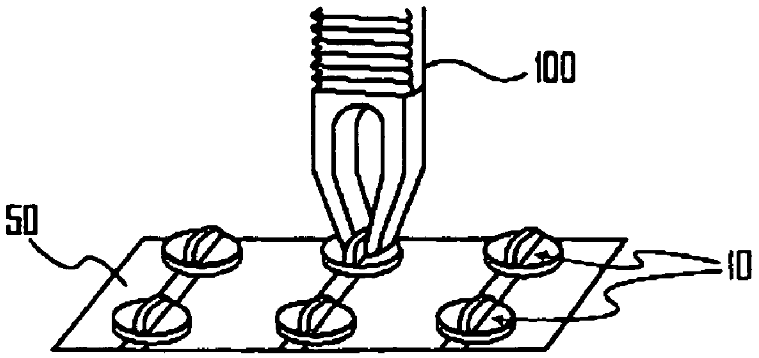
FIG. 7 is a drawing of wax guards in a holder and the tool grasping the bridge of one of the wax guards.

As shown in FIG. 7, the wax guards 10 may come on a flat or some other holder that may be fabricated from foam or some other suitable material. The tool 100 is placed above the bridge 24 of a wax guard 10; with the opening 126 between the jaws 120 aligned with the span of the bridge 24 and pushed downwardly onto the wax guard 10. The downward force of the tool 100 (in the direction of the tool axis 104) on the bridge 24 will cause the jaws 120 to move apart. Once the protrusions 124 get past the bridge 24, the jaws 120 will come together by virtue of the spring action of the tool 100. The tool 100 is now lifted up, pulling the wax guard 10 out of the holder 50.

Figure 8:
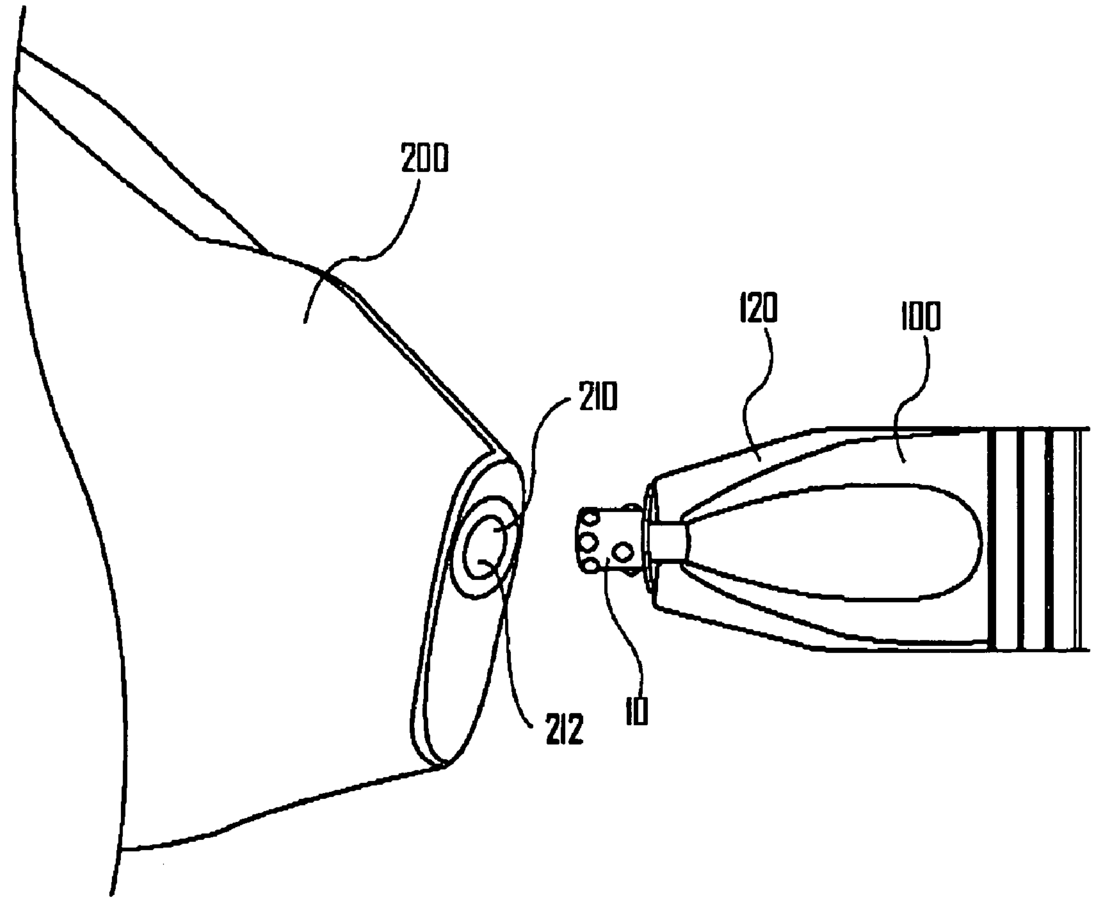
FIG. 8 is a photograph of the tool holding a wax guard in proximity to a receiver tube opening.
Figure 9:
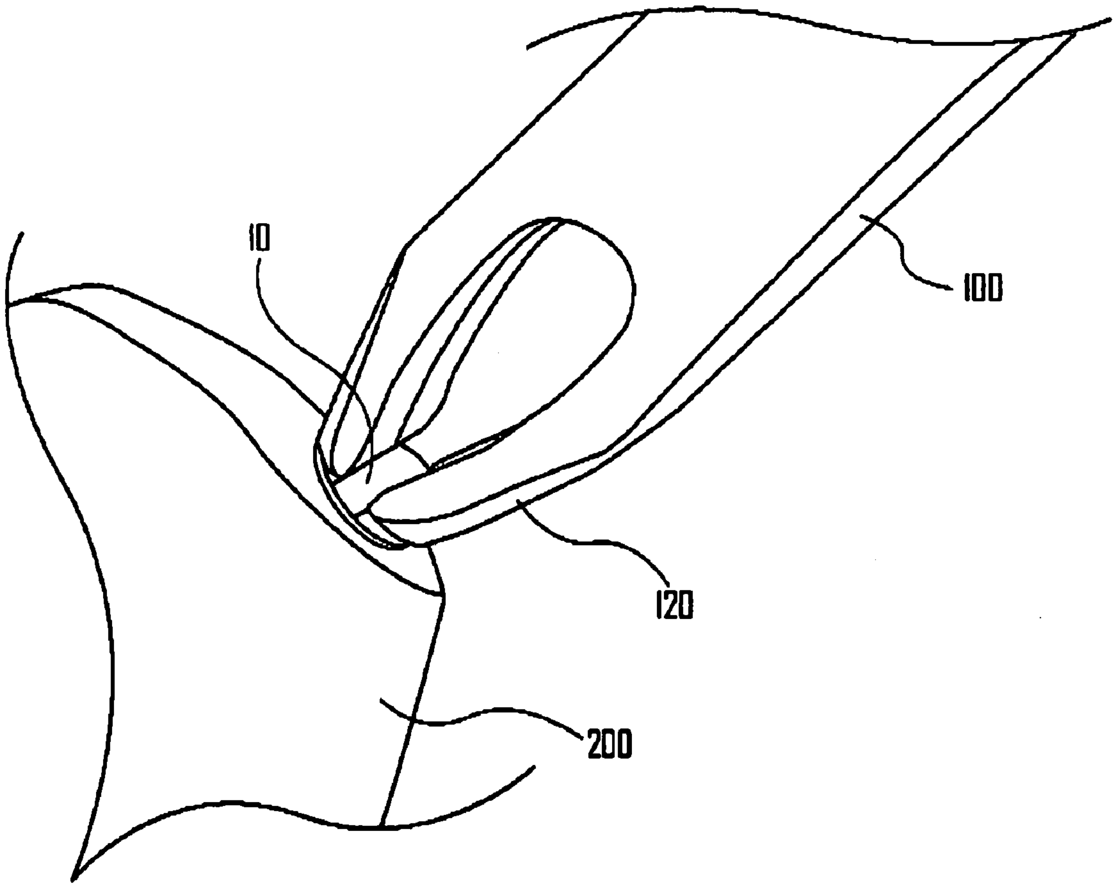
FIG. 9 is a photograph of the tool holding a wax guard inserted into the receiver tube opening.

As shown in FIG. 8, the tool 100 grasping a wax guard 10 in its jaws 120 is then positioned near a hearing instrument 200. The instrument 200 has an opening 210 to a receiver tube 212 that will accept a wax guard 10. The wax guard 10 is then inserted into the opening 210 as shown in FIG. 9.

Figure 10:
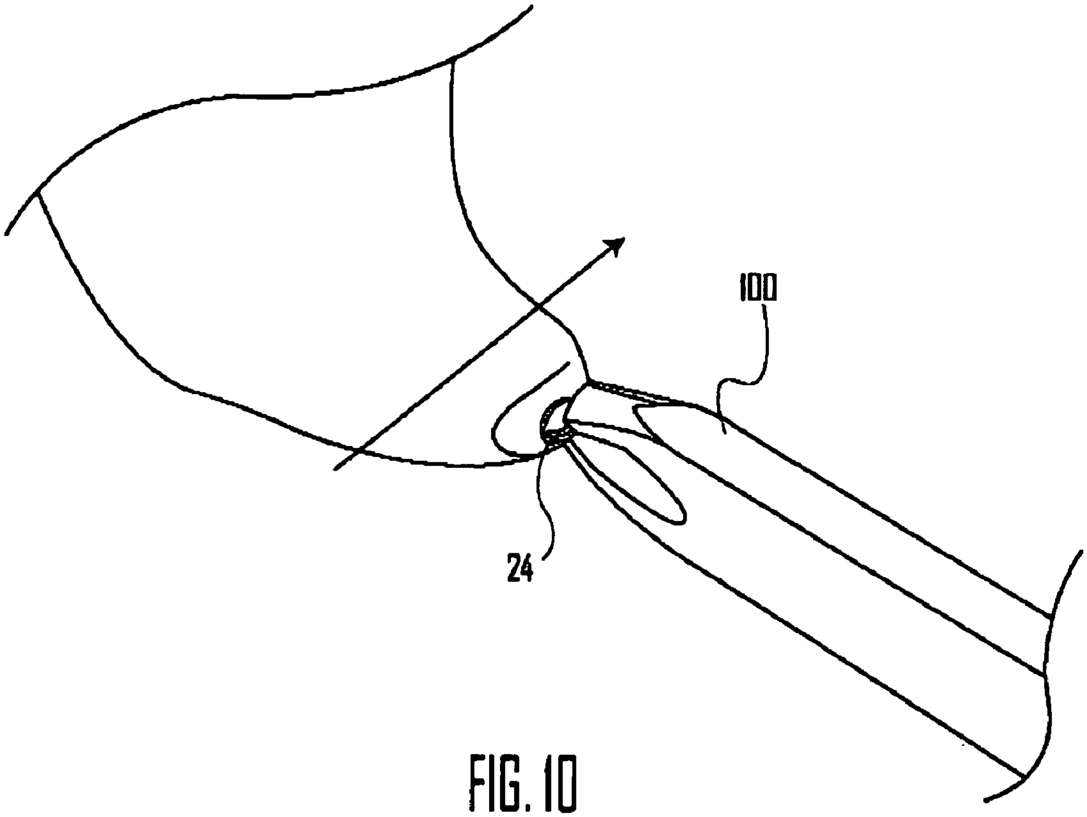
FIGS. 10 and 11 are photographs of the tool sliding off the bridge of a wax guard after the wax guard has been inserted into the receiver tube opening.
Figure 11:
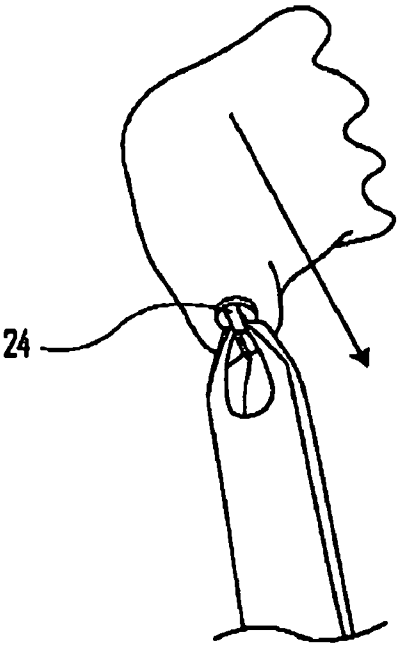

To remove the tool 100 from the wax guard 10, the tool 100 may be slid laterally along a line defined by the span of the bridge 24 (transverse to the tool axis 104, illustrated by the large arrow in FIGS. 10 and 11). The spring action of the tool 100 allows the elements to move apart and clear the bridge 24.

Tools 100 fabricated from polycarbonate such as Makrolon 6555 have performed satisfactorily. The dimensions of the jaws 120 are selected to yield a desired spring action and a pull force sufficient to remove the wax guard from the holder 50.

What is claimed is:

1. A method for inserting a wax guard having a bridge of a predefined width into a hearing instrument with a tool comprising a support element comprising an axis; a pair of flexible, opposing jaws affixed to the support element and spaced apart a predefined distance, where the jaws are oriented in a direction parallel to the axis of the support element;

where each jaw exhibits a spring-like behavior permitting them to move apart when a pull force in the direction of the axis exceeds a predefined amount;

the method comprising:

grasping a wax guard with the tool;

inserting the wax guard into the receiver tube; and sliding the tool off the bridge by moving the tool laterally with respect to the axis of the tool.

2. A method as set forth in claim 1, where the step of grasping a wax guard comprises pushing the tool down onto the bridge of the wax guard, temporarily forcing the jaws apart, and pushing the tool down further past the bridge, until the protrusions pass under the bridge.

* * * * *